United States Patent
Gouin et al.

(10) Patent No.: US 12,091,365 B2
(45) Date of Patent: Sep. 17, 2024

(54) METHOD OF MAKING A REFRACTORY ARTICLE

(71) Applicant: PYROTEK HIGH TEMPERATURE INDUSTRIAL PRODUCTS INC., Drummondville (CA)

(72) Inventors: Marcel Gouin, Sherbrooke (CA); François Veillette, Saint-Camille (CA); Alain Simard, Chicoutimi (CA)

(73) Assignee: PYROTEK HIGH TEMPERATURE INDUSTRIAL PRODUCTS INC., Drummondville (CA)

( * ) Notice: Subject to any disclaimer, the term of this patent is extended or adjusted under 35 U.S.C. 154(b) by 0 days.

(21) Appl. No.: 17/717,213

(22) Filed: Apr. 11, 2022

(65) Prior Publication Data
US 2022/0234961 A1   Jul. 28, 2022

Related U.S. Application Data

(63) Continuation of application No. 16/725,122, filed on Dec. 23, 2019, now Pat. No. 11,299,432.
(Continued)

(51) Int. Cl.
*C04B 35/565*   (2006.01)
*C04B 35/14*   (2006.01)
(Continued)

(52) U.S. Cl.
CPC .......... *C04B 35/565* (2013.01); *C04B 35/14* (2013.01); *C04B 35/22* (2013.01);
(Continued)

(58) Field of Classification Search
CPC ....... C04B 35/565; C04B 35/14; C04B 35/22; C04B 35/6316; C04B 35/632;
(Continued)

(56) References Cited

U.S. PATENT DOCUMENTS

| | | | |
|---|---|---|---|
| 4,436,680 | A | 3/1984 | Eschner et al. |
| 5,047,181 | A | 9/1991 | Occionero et al. |

(Continued)

FOREIGN PATENT DOCUMENTS

| | | |
|---|---|---|
| CN | 106414839 A | 2/2017 |
| CN | 109400179 A | 3/2019 |

(Continued)

OTHER PUBLICATIONS

English Translation of Office Action from Chinese Patent Application No. 201980033525.6 dated Dec. 17, 2021.
(Continued)

*Primary Examiner* — Bryan D. Ripa
*Assistant Examiner* — Cameron K Miller
(74) *Attorney, Agent, or Firm* — Calfee, Halter & Griswold LLP

(57) ABSTRACT

A method of making a refractory article is provided. The method includes: a) mixing a binder system, a refractory charge, and a second colloidal binder to form an aqueous slurry; b) casting the aqueous slurry into a mold; c) subjecting the mold containing the aqueous slurry to a temperature that is lower than a slurry casting temperature for a time sufficient to form a green strength article; and d) firing the green strength article at a temperature of at least 450° C. for a time sufficient to achieve thermal homogeneity, thereby forming a refractory article. Refractory articles made in accordance with the method have a unique combination of pore structure and mechanical properties.

19 Claims, 1 Drawing Sheet

Related U.S. Application Data

(60) Provisional application No. 62/886,707, filed on Aug. 14, 2019.

(51) Int. Cl.
- *C04B 35/22* (2006.01)
- *C04B 35/63* (2006.01)
- *C04B 35/632* (2006.01)
- *C04B 35/64* (2006.01)

(52) U.S. Cl.
CPC ........ *C04B 35/6316* (2013.01); *C04B 35/632* (2013.01); *C04B 35/64* (2013.01); *C04B 2235/3418* (2013.01); *C04B 2235/3454* (2013.01); *C04B 2235/3826* (2013.01); *C04B 2235/6027* (2013.01); *C04B 2235/656* (2013.01); *C04B 2235/77* (2013.01); *C04B 2235/9669* (2013.01)

(58) Field of Classification Search
CPC ............ C04B 35/64; C04B 2235/3418; C04B 2235/3454; C04B 2235/3826; C04B 2235/6027; C04B 2235/656; C04B 2235/77; C04B 2235/9669

See application file for complete search history.

(56) References Cited

U.S. PATENT DOCUMENTS

| | | | | |
|---|---|---|---|---|
| 5,880,046 | A * | 3/1999 | Delvaux | ............... C04B 35/22 501/133 |
| 6,254,810 | B1 * | 7/2001 | Delvaux | ............ B01D 39/2017 264/137 |
| 6,270,717 | B1 * | 8/2001 | Tremblay | ............. B01D 39/086 222/606 |
| 2005/0255290 | A1 * | 11/2005 | Drache | .................. B28B 1/007 264/28 |
| 2015/0251241 | A1 | 9/2015 | Ide et al. | |

FOREIGN PATENT DOCUMENTS

| | | |
|---|---|---|
| DE | 102011005914 A1 | 9/2012 |
| EP | 0356461 A1 | 3/1990 |
| JP | S5812225 B2 | 3/1983 |
| WO | 2001090030 A1 | 11/2001 |
| WO | 2012126820 A1 | 9/2012 |
| WO | 2015109408 A1 | 7/2015 |

OTHER PUBLICATIONS

Supplementary Search Report from European Patent Application No. 19845899.4 dated Nov. 11, 2021.

Search Report and Written Opinion from PCT/CA2019/051900 dated May 4, 2020.

English Translation of Office Action from Chinese Patent Application No. 201980033525.6 dated Sep. 26, 2022.

Mengping Huang, "Bridge Construction," Science Popularization Press, pp. 44-45, Feb. 1981.

Decision of Rejection from Chinese Patent Application No. 201980033525.6 dated Feb. 9, 2023.

Office Action from Japanese Application No. 2020-566985 dated Aug. 22, 2023, 9 pages.

Office Action from Taiwan Application No. 109127699 dated Mar. 5, 2024, 13 pages.

* cited by examiner

METHOD OF MAKING A REFRACTORY ARTICLE

CROSS-REFERENCE TO RELATED APPLICATIONS

This application is a continuation of U.S. patent application Ser. No. 16/725,122, filed Dec. 23, 2019, which claims priority to and the benefit of U.S. Provisional Patent Application No. 62/886,707, filed Aug. 14, 2019, the entire contents of which are incorporated by reference herein.

FIELD

The present disclosure relates to a method of making a refractory article. More particularly, the present disclosure relates to a method of making a refractory article that includes forming a green strength article from an aqueous slurry. The resulting refractory articles made in accordance with the method of the present disclosure have a unique combination of pore structure and mechanical properties.

BACKGROUND

Articles intended to be placed in harsh environments, such as elevated temperatures, erosive or corrosive environments, are often made of refractory material. Such refractory articles may be used for protection against gas, liquid, or solid at high temperatures in various processes in order to perform sensing, melting, transporting, casting, etc. Refractory articles are indispensable to the metal, glass, petrochemical, and cement industries to name just a few. Refractory articles can be produced with a relatively low porosity (e.g., <35%) or a relatively high porosity (e.g., ≥35%), which is typically reported as apparent porosity. Apparent porosity refers to the pores connected to the surface of the refractory article (or open pores).

In refractory design, there generally exists a tradeoff between strength and porosity. Generally, refractory articles with a high amount of porosity have excellent insulating properties (due to the high volume of air enclosed therein) and low bulk density, but also exhibit less corrosion resistance and less strength than lower porosity articles. Porosity may be desirable for any number of reasons, such as reducing the weight of an article, improving buoyancy, minimizing energy loss throughout the system, allowing fluid or gas flow pathways, as well as slowing crack propagation, thereby increasing the time to failure of an article.

However, the benefits of porosity largely assume some level of control on the pore structure, namely the size, shape, and distribution of pores in the article. Conventional low-cost sintering techniques often lack the ability to control porosity at a precise level and suffer from variations in material properties across similarly manufactured articles or even within the same article. One of the major challenges in controlling pore structure in the fired article is achieving uniform extraction of water from the liquid body. A non-uniform extraction of water results in variable shrinkage throughout the article which can lead to several undesirable outcomes such as formation of large concentrated pores or voids, geometrical warpage, and internal stressing or cracking of the article. There are many methods employed by those skilled in the art to minimize shrinkage variation, but most require tightly controlled processing parameters (e.g., specific mixers, precision molds, controlled environmental chambers, etc.), long dry times, or setting limitations on the design of the article or slurry composition to achieve higher manufacturing stability.

One interesting method for controlling water removal during forming is through use of aqueous freeze casting. This method involves templating the structure of ice crystal formation as water freezes to yield porous ceramics with a specific porosity. While the method shows promise, it also has several limitations. One primary limitation is that articles formed using this method generally have a lamellar porosity, where the major axis of the pore is significantly longer than the minor axis of the pore. In theory, this lamellar structure can provide an improved trade-off between strength and density, if strength is only required in one direction. However, in practice with complicated shapes as well as demands of throughput in a manufacturing setting, it is difficult to achieve the alignment of pores with the uniaxial load direction. This presents problems again in both manufacturing (cracking during formation) and use. Refractory articles that have a lamellar pore structure are brittle and prone to cracking if not loaded precisely as intended. Moreover, most real-world applications are loaded in multiple directions.

Accordingly, there remains a need in the art for methods of making refractory articles that address the foregoing problems.

SUMMARY

The present disclosure is related to a method of making a refractory article. To illustrate various aspects of the inventive concepts, several exemplary embodiments of the method are disclosed.

In accordance with the present disclosure, a method of making a refractory article is provided. The method includes: a) mixing a binder system, a refractory charge, and a second colloidal binder to form an aqueous slurry; b) casting the aqueous slurry into a mold, wherein the aqueous slurry is at a slurry casting temperature; c) subjecting the mold containing the aqueous slurry to a temperature that is less than the slurry casting temperature for a time sufficient to form a green strength article; and d) firing the green strength article at a temperature of at least 450° C. for a time sufficient to achieve thermal homogeneity, thereby forming a refractory article.

Other aspects, advantages, and features of the inventive concepts will become apparent to those skilled in the art from the following detailed description.

DETAILED DESCRIPTION

Figure 2:
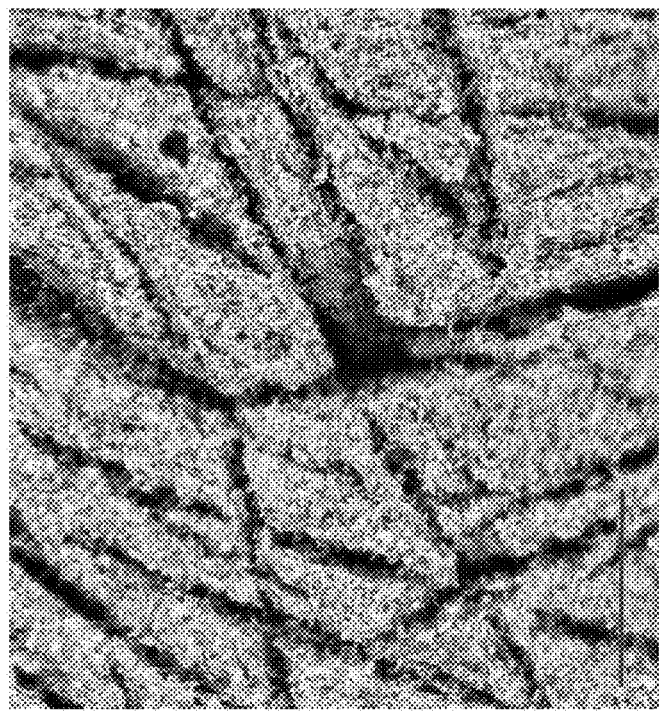
FIG. 2 is an optical digital microscope image, at approximately 100× magnification, of a refractory article made in accordance with a conventional freeze casting method (scale bar is 1 mm).

Disclosed herein are methods of making a refractory article and the resulting refractory articles. While the present disclosure describes exemplary embodiments of the methods and refractory articles in detail, the present disclosure is not intended to be limited to the disclosed embodiments.

Also, certain elements of exemplary embodiments disclosed herein are not limited to any exemplary embodiments, but instead apply to all embodiments of the present disclosure.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Furthermore, the phrase "at least one of A, B, and C" should be interpreted as "only A or only B or only C or any combinations thereof."

The methods of making a refractory article and the resulting refractory articles of the present disclosure can comprise, consist of, or consist essentially of the essential elements of the disclosure as described herein, as well as any additional or optional element described herein or which is otherwise useful in refractory applications.

All percentages, parts, and ratios as used herein are by weight of the total composition, unless otherwise specified. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The term "green strength article" as used herein refers to an article that is formed from an aqueous slurry that has been sufficiently solidified such that the article can be handled and/or manipulated.

The terms "isotropic distribution of pores" or "isotropic pore distribution" are used interchangeably herein to refer to pores in a refractory article that have a substantially uniform shape, size, and spacing throughout the refractory article. As used herein, the term "substantially uniform" means that a particular value is within 25% of the respective average value. For example, a substantially uniform pore size means that the size of an individual pore is within 25% of the average pore size in the refractory article.

The method of making a refractory article according to the present disclosure includes: a) mixing a binder system, a refractory charge, and a second colloidal binder to form an aqueous slurry; b) casting the aqueous slurry into a mold, wherein the aqueous slurry is at a slurry casting temperature; c) subjecting the mold containing the aqueous slurry to a temperature that is less than the slurry casting temperature for a time sufficient to form a green strength article; and d) firing the green strength article at a temperature of at least 450° C. for a time sufficient to achieve thermal homogeneity, thereby forming a refractory article. The methods of the present disclosure produce refractory articles having a unique combination of pore structure and mechanical properties.

As mentioned above, the benefits of porosity in a refractory article largely assume some level of control on the pore structure, such as pore size, pore shape, and pore distribution. When comparing two refractory articles having the same apparent porosity, a refractory article with smaller, more uniformly distributed pores will generally be more insulating across 3-dimensions than a refractory article with less controlled porosity. Furthermore, most real-world applications of refractory articles involve loading in multiple directions, which requires a greater homogeneity of strength (e.g., strength in multiple directions as opposed to a single (uniaxial) direction). The methods of the present disclosure provide refractory articles that possess a greater homogeneity of strength, as well as an improved strength to weight ratio (or strength to density ratio), due to a more isotropic distribution of pores created in the refractory articles.

The methods of the present disclosure have yielded surprising results, allowing for the formation of refractory articles with various refractory materials that are lighter, stronger, more insulating, and more cost efficient than previously possible. It is the combination of properties, the improved relationship between strength and density (or porosity) for a given refractory material that signifies a positive step in the optimization of internal structure and enhanced capabilities to meet an expanded range of specific design criteria.

Furthermore, the methods of the present disclosure can provide significant process cost and time savings. For example, the methods of the present disclosure provide refractory articles with low dimensional shrinkage, or net shape articles, which do not suffer the same warpage phenomenon associated with conventional methods. This correlates with a reduction in internal forming stresses, which is realized as excellent thermal shock properties of the green strength article. In the examples that follow, each green strength article is taken directly from a freezer (e.g., at −80° C.) and placed into an oven (e.g., at 700° C.) with no intermediary step. This alone is a remarkable achievement and offers the potential for significant time, cost, and space savings on a manufacturing floor. The net shape is additionally beneficial when tight tolerances are demanded. In addition, the net shape of the refractory article also limits the amount of labor or machine time required to achieve specific geometries.

The method of the present disclosure includes the formation of an aqueous slurry by mixing together a binder system, a refractory charge, and a second colloidal binder. In embodiments of the present disclosure, the binder system comprises a caramelized carbohydrate component, an adjuvant, and a first colloidal binder. In embodiments of the present disclosure, the binder system is an aqueous liquid. Any of the mixing steps described herein may be carried out using conventional mixing equipment, such as a high shear mixer.

In embodiments, the method of the present disclosure further includes forming the binder system. In embodiments of the present disclosure, the binder system may be formed by preparing a caramelized carbohydrate component and mixing the caramelized carbohydrate component with an adjuvant and a first colloidal binder.

In embodiments of the present disclosure, the caramelized carbohydrate component is obtained by caramelization of a mixture comprising water and a carbohydrate. In certain embodiments, the caramelization is carried out by heating the mixture comprising water and the carbohydrate to a caramelization temperature, such as a temperature of 20° C. to 125° C., including 50° C. to 120° C., 60° C. to 120° C., 70° C. to 120° C., 80° C. to 120° C., 90° C. to 115° C., 100° C. to 110° C., and also including 100° C. to 105° C., for an effective amount of time to caramelize the carbohydrate, such as a time period of at least 5 minutes, including from 5 minutes to 30 minutes, from 5 minutes to 20 minutes, and also including from 5 minutes to 10 minutes. One of skill in the art can readily determine an appropriate caramelization temperature and amount of time to caramelize based on the carbohydrate(s) used. While the caramelization process remains poorly understood, heating of the carbohydrate will form, inter alia, caramel products, such as caramelan, caramelen, and caramelin.

The caramelized carbohydrate component may be derived from the caramelization of a variety of carbohydrates. In accordance with the present disclosure, the caramelized carbohydrate component is derived from at least one of a monosaccharide, a disaccharide, a trisaccharide, and an oligosaccharide. Exemplary monosaccharides include, but are not limited to, glucose, fructose, and galactose. Exemplary disaccharides include, but are not limited to, sucrose, lactose, and maltose. Exemplary trisaccharides include, but are not limited to, maltotriose and raffinose. Exemplary oligosaccharides include, but are not limited to, maltodextrin, fructooligosaccharides, and galactooligosaccharides. In embodiments of the present disclosure, the caramelized carbohydrate component is derived from at least one of sucrose, glucose, fructose, galactose, maltose, and lactose. In embodiments of the present disclosure, the caramelized carbohydrate component is derived from sucrose.

In other embodiments, a pre-caramelized, caramelized carbohydrate (e.g., a commercially available caramelized carbohydrate) may be mixed with water to form the caramelized carbohydrate component. In such embodiments, the pre-caramelized, caramelized carbohydrate and water mixture need not be processed (e.g., heated to a caramelization temperature) to obtain the caramelized carbohydrate component. Furthermore, in such embodiments, the resulting caramelized carbohydrate component may be mixed with a first colloidal binder and an adjuvant to form the binder system.

In accordance with the present disclosure, the binder system comprises an adjuvant. In embodiments, an adjuvant may be added to the mixture of water and the carbohydrate that is heated to form the caramelized carbohydrate component. Accordingly, in such embodiments, the adjuvant is a component of the caramelized carbohydrate component. In embodiments, an adjuvant may be added to a caramelized carbohydrate component that is obtained by mixing a pre-caramelized, caramelized carbohydrate and water. The adjuvant may be one or more of an acid, an inorganic wetting agent, and an acid phosphate adhesive. Exemplary acids include, but are not limited to, phosphoric acid, sulfuric acid, citric acid, acetic acid, boric acid, and oxalic acid. The acid may be useful for promoting caramelization of the carbohydrate at a lower temperature than would typically be required. Exemplary inorganic wetting agents include, but are not limited to, aluminum ammonium sulfate, magnesium sulfate, and aluminum sulfate. The inorganic wetting agent may act as a wetting agent in aqueous medium for the caramel products to wet out the refractory charge. Exemplary acid phosphate adhesives include, but are not limited to, a calcium phosphate, a magnesium phosphate, and an aluminum phosphate, including monobasic, dibasic, and tribasic forms thereof, and various hydrates thereof.

In embodiments, the caramelized carbohydrate component includes at least one of: an acid comprising at least one of phosphoric acid, sulfuric acid, citric acid, acetic acid, boric acid, and oxalic acid; an inorganic wetting agent comprising at least one of aluminum ammonium sulfate, magnesium sulfate, and aluminum sulfate; and an acid phosphate adhesive comprising at least one of calcium phosphate, magnesium phosphate, and aluminum phosphate. In certain embodiments, the caramelized carbohydrate component includes phosphoric acid, which may be obtained by a mixture of 75 wt % $H_3PO_4$ and 25 wt % water, aluminum ammonium sulfate, which may include $AlNH_4(SO_4)_2 \cdot 12\ H_2O$, and calcium phosphate monobasic, which may include the anhydrous or monohydrate forms. In embodiments, the caramelized carbohydrate component comprises one or more acids, and optionally comprises an inorganic wetting agent and/or an acid phosphate adhesive.

In embodiments, the caramelized carbohydrate component is formed by caramelization of a mixture comprising 25 wt % to 75 wt % of a carbohydrate, 25 wt % to 70 wt % of water, 0.01 wt % to 25 wt % of acid, 0 wt % to 5 wt % of inorganic wetting agent, and 0 wt % to 2 wt % of acid phosphate adhesive.

In embodiments of the present disclosure, the caramelized carbohydrate component is formed by caramelization of a mixture comprising 40 wt % to 60 wt % of a carbohydrate, 40 wt % to 60 wt % of water, 1 wt % to 25 wt % of acid, 0 wt % to 1 wt % of inorganic wetting agent, and 0 wt % to 1.5 wt % of an acid phosphate adhesive.

In embodiments of the present disclosure, the caramelized carbohydrate component is formed by caramelization of a mixture comprising 40 wt % to 50 wt % of a carbohydrate, 25 wt % to 40 wt % of water, 15 wt % to 25 wt % of acid, 0.25 wt % to 0.75 wt % of inorganic wetting agent, and 1 wt % to 1.5 wt % of acid phosphate adhesive.

In embodiments of the present disclosure, the caramelized carbohydrate component is formed by caramelization of a mixture comprising 45 wt % to 55 wt % of a carbohydrate, 30 wt % to 40 wt % of water, 0.5 wt % to 1.5 wt % of acid, 0.5 wt % to 0.75 wt % of inorganic wetting agent, and 1 wt % to 1.5 wt % of acid phosphate adhesive.

In embodiments of the present disclosure, the caramelized carbohydrate component is formed by caramelization of a mixture comprising 65 wt % to 75 wt % of a carbohydrate, 25 wt % to 30 wt % of water, and 1.25 wt % to 1.75 wt % of acid.

In certain of the foregoing embodiments, the carbohydrate comprises sucrose, the acid comprises phosphoric acid, which may be obtained by a mixture of 75 wt % $H_3PO_4$ and 25 wt % water, the inorganic wetting agent comprises aluminum ammonium sulfate, which may include $AlNH_4(SO_4)_2 \cdot 12\ H_2O$, and the acid phosphate adhesive comprises calcium phosphate monobasic, which may include the anhydrous or monohydrate forms. In certain of the foregoing embodiments, the acid comprises phosphoric acid and boric acid.

In embodiments of the present disclosure, the adjuvant is added to the caramelized carbohydrate component after the caramelized carbohydrate component is formed.

In addition to the caramelized carbohydrate component and the adjuvant, the binder system of the present disclosure also includes a first colloidal binder. In accordance with the present disclosure, the first colloidal binder comprises at least one of a colloidal silica, a colloidal alumina, a colloidal zirconia, a colloidal yttria, and organically modified versions of the foregoing. One example of an organically modified colloidal binder is Ludox® SK colloidal silica, which is commercially available from W. R. Grace & Co.-Conn. (Columbia, Maryland). In general, the first colloidal binder is a suspension comprising submicron-sized inorganic particles (e.g., $SiO_2$, $Al_2O_3$, $ZrO_2$) dispersed in an aqueous solution. In embodiments of the present disclosure, the first colloidal binder used to form the binder system comprises a colloidal silica.

One example of a first colloidal binder suitable for use in the binder system of the present disclosure is NALCO 1144 colloidal silica, which is commercially available from Nalco Company (Naperville, Illinois). The NALCO 1144 colloidal silica suspension has the following properties: 40 wt % of colloidal silica as $SiO_2$; a pH of 9.9 at 25° C.; an average particle diameter of 14 nm; a specific gravity of 1.30; a viscosity of 15 cP; and 0.45 wt % of $Na_2O$.

As previously mentioned, the binder system of the present disclosure comprises a mixture of the caramelized carbohydrate component, the adjuvant, and the first colloidal binder. In embodiments of the present disclosure, the caramelized carbohydrate component, which may comprise from 0.01 wt % to 25 wt % adjuvant (based on the total weight of the caramelized carbohydrate component), comprises from 5 wt % to 95 wt % of the binder system, and the first colloidal binder comprises from 5 wt % to 95 wt % of the binder system. In embodiments of the present disclosure, the caramelized carbohydrate component, which may comprise from 0.01 wt % to 25 wt % adjuvant (based on the total weight of the caramelized carbohydrate component) comprises from 10 wt % to 90 wt % of the binder system, and the first colloidal binder comprises from 10 wt % to 90 wt % of the binder system. In embodiments of the present disclosure, the caramelized carbohydrate component, which may comprise from 0.01 wt % to 25 wt % adjuvant (based on the total weight of the caramelized carbohydrate component), comprises from 15 wt % to 85 wt % of the binder system, and the first colloidal binder comprises from 15 wt % to 85 wt % of the binder system. In embodiments of the present disclosure, the caramelized carbohydrate component, which may comprise from 0.01 wt % to 25 wt % adjuvant (based on the total weight of the caramelized carbohydrate component), comprises from 25 wt % to 75 wt % of the binder system, and the first colloidal binder comprises from 25 wt % to 75 wt % of the binder system. In embodiments of the present disclosure, the caramelized carbohydrate component, which may comprise from 0.01 wt % to 25 wt % adjuvant (based on the total weight of the caramelized carbohydrate component), comprises from 40 wt % to 70 wt % of the binder system, and the first colloidal binder comprises from 30 wt % to 60 wt % of the binder system. In embodiments of the present disclosure, the caramelized carbohydrate component, which may comprise from 0.01 wt % to 25 wt % adjuvant (based on the total weight of the caramelized carbohydrate component), comprises from 55 wt % to 75 wt % of the binder system, and the first colloidal binder comprises from 25 wt % to 45 wt % of the binder system. In embodiments of the present disclosure, the caramelized carbohydrate component, which may comprise from 0.01 wt % to 25 wt % adjuvant (based on the total weight of the caramelized carbohydrate component), comprises from 60 wt % to 70 wt % of the binder system, and the first colloidal binder comprises from 30 wt % to 40 wt % of the binder system. Any of the previously described caramelized carbohydrate components, adjuvants, and first colloidal binders may be used in the foregoing embodiments of the binder system.

In embodiments of the present disclosure, the caramelized carbohydrate component comprises from 40 wt % to 70 wt % of the binder system and is formed by caramelization of a mixture comprising 50 wt % to 60 wt % of a carbohydrate, such as sucrose, 35 wt % to 45 wt % of water, 0.75 wt % to 1.5 wt % of acid, such as phosphoric acid, 0.25 wt % to 0.75 wt % of inorganic wetting agent, such as aluminum ammonium sulfate, and 1 wt % to 1.5 wt % of an acid phosphate adhesive, such as calcium phosphate monobasic; and the first colloidal binder comprises from 30 wt % to 60 wt % of the binder system and comprises a colloidal silica.

In embodiments of the present disclosure, the binder system comprises from 5 wt % to 70 wt % caramelized carbohydrate component, from 0.25 wt % to 10 wt % adjuvant, and from 25 wt % to 90 wt % first colloidal binder, based on the total weight of the binder system. In embodiments of the present disclosure, the binder system comprises from 5 wt % to 45 wt % caramelized carbohydrate component, from 0.25 wt % to 3 wt % adjuvant, and from 50 wt % to 90 wt % first colloidal binder, based on the total weight of the binder system. In embodiments of the present disclosure, the binder system comprises from 55 wt % to 70 wt % caramelized carbohydrate component, from 2 wt % to 10 wt % adjuvant, and from 25 wt % to 40 wt % first colloidal binder, based on the total weight of the binder system.

As mentioned above, the aqueous slurry of the present disclosure is formed by mixing the binder system together with a refractory charge and a second colloidal binder. In embodiments of the present disclosure, the second colloidal binder used to form the aqueous slurry comprises at least one of a colloidal silica, a colloidal alumina, a colloidal zirconia, a colloidal yttria, and organically modified versions of the foregoing. In embodiments of the present disclosure, the second colloidal binder is the same material as the first colloidal binder used to form the binder system. In embodiments of the present disclosure, the second colloidal binder is a different material from the first colloidal binder used to form the binder system. In embodiments of the present disclosure, the second colloidal binder and the first colloidal binder used to form the binder system both comprise a colloidal silica.

In accordance with the present disclosure, the aqueous slurry includes a refractory charge. A variety of refractory charges may be used in the methods of the present disclosure. The refractory charge used to form a refractory article in accordance with the methods of the present disclosure may be selected based upon a variety of factors including, but not limited to, the particular application in which the refractory article will be used, the particular type of chemical environment or molten metal with which the refractory article will come into contact, and so forth.

The refractory charge according to the present disclosure may be provided in different forms (e.g., fibrous, acicular, lamellar, granular) and may be of mineral or synthetic origin. In accordance with the present disclosure, the refractory charge comprises one or more of a silicate, a metal oxide, a boride, a nitride, a carbide, a sulfide, a fluoride, an aluminide, a synthetic glass, glass fibers (e.g., E-glass fibers), refractory ceramic fibers, non-refractory ceramic fibers, graphite, bone ash, aluminum titanate, and calcium aluminate. Exemplary silicates include, but are not limited to, aluminum silicate, magnesium silicate, calcium silicate, sodium silicate, potassium silicate, zirconium silicate, mica, wollastonite, microlite, and talc. Exemplary metal oxides include, but are not limited to, MgO, $A_2O_3$, $TiO_2$, $ZrO_2$, $Y_2O_3$, $MgAl_2O_4$, and $WO_2$. Exemplary borides include, but are not limited to, $TiB_2$ and $ZrB_2$. Exemplary nitrides include, but are not limited to, boron nitride, aluminum nitride, and silicon nitride. Exemplary carbides include, but are not limited to, silicon carbide and boron carbide. Exemplary sulfides include, but are not limited to, $BaSO_4$. Exemplary fluorides include, but are not limited to, $CaF_2$ and $AlF_3$. Exemplary aluminides include, but are not limited to, MgAl and TiAl.

In embodiments, the refractory charge comprises at least one of boron nitride, aluminum silicate, magnesium silicate, calcium silicate, sodium silicate, potassium silicate, zirconium silicate, fused silica, mica, wollastonite, microlite, talc, MgO, $A_2O_3$, $TiO_2$, $ZrO_2$, $Y_2O_3$, $MgAl_2O_4$, and $WO_2$, E-glass fibers, $TiB_2$, $ZrB_2$, aluminum nitride, silicon nitride, silicon carbide, boron carbide, $BaSO_4$, $CaF_2$, $AlF_3$, MgAl, and TiAl. In embodiments, the refractory charge comprises at least one of boron nitride, mica, zircon, talc, wollastonite, fused silica, silicon carbide, microlite, barium sulfate, calcium fluoride, magnesium fluorosilicate, graphite, bone ash, titanium dioxide, and aluminum fluoride. In embodiments, the refractory charge used to form the aqueous slurry of the present disclosure comprises at least one of wollastonite, fused silica, and silicon carbide.

In embodiments, the aqueous slurry formed in accordance with the method of the present disclosure comprises 2 wt % to 10 wt % binder system, 40 wt % to 75 wt % refractory charge, and 20 wt % to 50 wt % second colloidal binder. In embodiments, the aqueous slurry formed in accordance with the method of the present disclosure comprises 2 wt % to 10 wt % binder system, 40 wt % to 70 wt % refractory charge, and 25 wt % to 50 wt % second colloidal binder. In embodiments, the aqueous slurry formed in accordance with the method of the present disclosure comprises 5 wt % to 10 wt % binder system, 45 wt % to 70 wt % refractory charge, and 25 wt % to 48 wt % second colloidal binder. Any of the previously described binder systems, refractory charges, and second colloidal binders may be used to form the aqueous slurry of the present disclosure. In embodiments, the aqueous slurry formed in accordance with the method of the present disclosure comprises: 2 wt % to 10 wt % binder system; 40 wt % to 75 wt % refractory charge comprising at least one of wollastonite, fused silica, and silicon carbide; and 20 wt % to 50 wt % second colloidal binder comprising colloidal silica. In embodiments, the aqueous slurry formed in accordance with the method of the present disclosure comprises: 2 wt % to 10 wt % binder system; 60 wt % to 75 wt % refractory charge comprising at least one of wollastonite, fused silica, and silicon carbide; and 20 wt % to 50 wt % second colloidal binder comprising colloidal silica. In embodiments, the aqueous slurry formed in accordance with the method of the present disclosure comprises: 2 wt % to 10 wt % binder system; 65 wt % to 75 wt % refractory charge comprising at least one of wollastonite, fused silica, and silicon carbide; and 20 wt % to 50 wt % second colloidal binder comprising colloidal silica.

In addition to the binder system, the refractory charge, and the second colloidal binder, the aqueous slurry of the present disclosure may also include one or more additives. Such additives may be present in the aqueous slurry in amount of less than 0.1 wt % based on the total weight of the aqueous slurry. Exemplary additives suitable for use in the aqueous slurry of the present disclosure include, but are not limited to, rheology modifiers, dispersants, and plasticizers.

In accordance with the present disclosure, the method of making a refractory article includes casting the aqueous slurry into a mold. The mold may correspond to any desired shape for the refractory article being produced. The mold may be formed of a variety of materials including, but not limited to, cardboard, foams (e.g., polystyrene), metals, wood, plastics, natural polymers, and synthetic polymers.

In accordance with the present disclosure, the aqueous slurry is at a slurry casting temperature when the aqueous slurry is cast into the mold. The slurry casting temperature may vary widely. In embodiments, the slurry casting temperature may be greater than 0° C. to less than 100° C., including 1° C. to 80° C., 1° C. to 60° C., 5° C. to 50° C., 10° C. to 40° C., and also including 15° C. to 30° C.

The mold may be at various temperatures (e.g., room temperature (15° C. to 30°), above room temperature (>30° C.), below room temperature (<15° C.)) when the aqueous slurry is cast into the mold. In embodiments, the mold may be at a temperature of 30° C. to 100° C. when the aqueous slurry is cast into the mold. In embodiments, the mold may be at a temperature of 15° C. to 30° C. when the aqueous slurry is cast into the mold. In embodiments, the mold may be at a temperature of −195° C. to 15° C. when the aqueous slurry is cast into the mold.

In embodiments, the method of the present disclosure further includes placing one or more reinforcement material (s) into or on the mold. Examples of suitable reinforcement materials that may be incorporated into or on the mold include, but are not limited to, a high temperature fabric (e.g., woven glass fiber mats, woven carbon fiber mats), glass fibers, refractory ceramic fibers, non-refractory ceramic fibers, carbon fibers, synthetic fibers (e.g., polymer fibers, polypropylene fibers), metal fibers (e.g., steel needles), mineral fibers, and metal anchoring of various sizes and geometries. In embodiments, the method of the present disclosure further includes adding one or more reinforcement materials (e.g., any one or more of the fiber materials described above, a refractory fiber material) directly into the aqueous slurry. In embodiments, the method of the present disclosure includes placing a layer of a high temperature fabric, preferably a woven glass fiber mat, into or on the mold prior to casting the aqueous slurry into the mold. In embodiments, the method of the present disclosure includes placing a layer of a high temperature fabric, preferably a woven glass fiber mat, into or on the mold, casting a first portion of the aqueous slurry into the mold, placing an additional layer of a high temperature fabric, preferably a woven glass fiber mat, on the first portion of the aqueous slurry cast into the mold, and casting a second portion of the aqueous slurry into the mold. This process may be repeated multiple times to form multiple layers of reinforcement material and aqueous slurry. However, it should be understood that the aqueous slurry may fully impregnate or saturate the multiple layers of reinforcement material (e.g., such that the reinforcement material is embedded in the aqueous slurry).

In accordance with the present disclosure, the method of making a refractory article includes subjecting the mold containing the aqueous slurry to a temperature and for a time sufficient to form a green strength article. In accordance with the present disclosure, the mold containing the aqueous slurry will be subjected to a temperature that is lower than the slurry casting temperature. In other words, the aqueous slurry cast into the mold will solidify by subjecting the aqueous slurry to lower temperatures, thereby forming a green strength article. For example, the aqueous slurry cast into the mold will solidify by freezing, thereby forming a green strength article. The step of forming a green strength article may be carried out using conventional techniques and equipment known to those of skill in the art (e.g., freezers, exposure to liquid nitrogen). In embodiments, the mold containing the aqueous slurry is subjected to a temperature of −195° C. to 0° C. for a time sufficient to form the green strength article. In embodiments, the mold containing the aqueous slurry is subjected to a temperature of −150° C. to 0° C., including a temperature of −125° C. to 0° C., a temperature of −100° C. to −10° C., a temperature of −90° C. to −25° C., a temperature of −90° C. to −50° C., and also including a temperature of −85° C. to −75° C. for a time sufficient to form the green strength article. The time required to form the green strength article may vary depending on a variety of parameters including, for example, mass, shape/geometry, the aqueous slurry composition, and the temperature at which the mold containing the aqueous slurry is subjected. In embodiments, the time required to form the green strength article may be from 1 minute to 72 hours, including from 10 minutes to 60 hours, 30 minutes to 48 hours, 1 hour to 36 hours, 2 hours to 24 hours, from 6 hours to 24 hours, from 8 hours to 24 hours, from 12 hours to 24 hours, from 18 hours to 24 hours, and also including from 24 hours to 72 hours. In embodiments, the time required to form the green strength article may be from 1 minute to 1 hour.

The step of forming the green strength article from the aqueous slurry is critical to the method of the present disclosure. Without wishing to be bound by any particular theory, it is believed that the binder system utilized to form the aqueous slurry, particularly the caramelized carbohydrate component, and the step of forming the green strength article by subjecting the mold containing the aqueous slurry to the temperatures described herein synergistically produce the unique and advantageous globular pore structure and isotropic distribution of pores in the refractory articles. Again, without wishing to be bound by any particular theory, a freeze-cast green strength article is believed to be formed as the refractory charge particles in the aqueous slurry are rejected from the solidification front and trapped between the growing ice crystals. This process is believed to be governed by the laws of thermodynamics and the relationship in surface free energy between the solidifying body, the liquid, and the individual refractory charge particles. It is believed that the caramelized carbohydrate component of the binder system alters both the viscosity of the liquid and the surface free energy of the refractory charge particles, which changes the extraction of the refractory charge particle from the ice front, resulting in the articles described herein. It is further believed that the caramelized carbohydrate component of the binder systems aids in the controlled removal of water from the system through evaporative syneresis, which makes possible the ability to process the green strength article directly from a freezer (e.g., at −80° C.) to an oven (e.g., at 700° C.) with no intermediary steps (e.g., a drying step). Furthermore, and again, not wishing to be bound by any particular theory, it is believed that underlying principle of the methods of the present disclosure and the resulting refractory articles are not strongly dependent on the particular refractory charge used but rely more on physical interactions rather than chemical interactions.

Refractory articles that are freeze-casted without forming the green strength article in accordance with the present disclosure will generally have a lamellar porosity and a heterogeneous distribution of pores as opposed to the globular pores and the isotropic distribution of pores achieved with the methods of the present disclosure. As previously mentioned, refractory articles having a lamellar porosity are often brittle, prone to cracking, and typically exhibit strength in a uniaxial direction.

In accordance with the present disclosure, the method of making a refractory article includes firing the green strength article at a temperature of at least 450° C. for a time sufficient to achieve thermal homogeneity, thereby forming a refractory article. In embodiments, the green strength article is fired at an oven temperature of 450° C. to 1,500° C., including an oven temperature of 550° C. to 1,250° C., an oven temperature of 550° C. to 1,200° C., an oven temperature of 600° C. to 1,150° C., an oven temperature of 650° C. to 1,100° C., an oven temperature of 675° C. to 1,000° C., an oven temperature of 675° C. to 900° C., an oven temperature of 675° C. to 850° C., an oven temperature of 675° C. to 800° C., and also including a temperature of 675° C. to 725° C. for a time sufficient to achieve thermal homogeneity, thereby forming a refractory article. The time required to achieve thermal homogeneity may vary depending on a variety of parameters including, for example, the mass, the shape/geometry, the aqueous slurry composition used to form the green strength article, and the temperature at which the green strength article is fired. In embodiments, the time required to achieve thermal homogeneity during firing will be from 0.5 hour to 24 hours, including from 1 hour to 18 hours, from 1 hour to 12 hours, from 1 hour to 8 hours, from 1 hour to 5 hours, and also including from 2 hours to 3 hours. Firing of the green strength article may be accomplished using conventional equipment such as an oven, furnace, or kiln.

In embodiments of the present disclosure, the method further includes demolding the green strength article prior to firing the green strength article. In embodiments of the present disclosure, the method includes firing the mold and the green strength article and, thus, a demolding step is not required. In embodiments where the mold and green strength article are fired together, the mold is formed of a material that will burn or otherwise decompose during firing, such as a cardboard or a foam material.

In embodiments of the present disclosure, the method does not include drying the green strength article prior to firing. In other words, the green strength article (containing solidified water) may be fired immediately without additional processing. Conventional processes typically utilize a drying step to remove water or other solvents prior to firing. However, the method of the present disclosure does not require such a drying step to form a refractory article having the unique pore structure and advantages described herein. Furthermore, eliminating the conventional drying step provides economic advantages, as a drying step requires floor space, equipment, man power, and planning. While a drying step is not required and, indeed is not preferred, in other embodiments, the method of the present disclosure may include drying the green strength article prior to firing. The drying step may be accomplished using drying equipment (e.g., an oven, a freeze dryer) or by letting the green strength article dry naturally at ambient or room temperature.

In embodiments, the method of the present disclosure includes cooling the refractory article after the firing step. In embodiments, the cooling step may be performed by allowing the refractory article to cool naturally at ambient or room temperature. In embodiments, the cooling step may be performed in controlled stages. For example, the refractory article, after firing, may be cooled by allowing the oven to cool to a predetermined temperature, opening the oven for a predetermined time, and removing the refractory article from the oven. The particular parameters of the controlled stages of the cooling step will typically depend on the size and the shape of the refractory article, as well as the particular refractory charge. One of skill in the art can readily determine the particular parameters of the controlled stages of the cooling step with routine experimentation.

The methods of the present disclosure produce refractory articles having a number of unique features and advantages including, but not limited to, an open and globular porosity, an isotropic pore distribution, a low density, a higher strength to density ratio, and net shape. The openness of the porosity allows fluids to easily flow through the refractory article matrix, which may be advantageous in filtration applications or when dispersing a beneficial liquid such as a lubricant, catalyst, or protective coating throughout the refractory article. The globular shape of the pores may provide better resistance to crack initiation and/or crack propagation in the refractory article. By having a low density, the refractory articles formed in accordance with the methods of the present disclosure may be lighter, which can reduce stresses on components that mate with or otherwise join to a refractory article, as well as improve safety for process operators (e.g., the lighter article is easier to lift). Furthermore, the low density can improve the buoyancy of the refractory article in a molten metal (e.g., if a refractory article breaks, the pieces will float on top of the molten metal and can be easily removed). The strength of the refractory article provides resistance to mechanical solicitation (e.g., pressure, abrasion, deformation, creep, etc.) to enhance the life span of the refractory article. The isotropic distribution of pores is believed to provide the refractory articles made in accordance with the methods of the present disclosure with a greater homogeneity of strength, as well as an improved strength to weight ratio (or strength to density ratio). In addition, refractory articles formed in accordance with the methods of the present disclosure are net shape with very low or no shrinkage or deformation relative to the mold shape. Minimizing the amount of shrinkage opens the door for more complex shapes, tighter tolerances, less finishing process time required, and reduced potential for in-process scrap from thermal stresses. Although the refractory articles generally have a net shape or a near net shape, the refractory articles formed in accordance with the methods of the present disclosure may also be machined to a desired shape and/or finish.

A variety of refractory articles for a variety of applications may be produced using the methods of the present disclosure. Refractory articles that may be made in accordance with the methods of the present disclosure include, but are not limited to, monolithic big blocks (for furnace walls), ladles, spouts, launders, dosing tubes, plungers, pins, floats, tundish, head box, crucibles, burner tips, filters, insulating/conducting bricks, insulating/conducting boards, diffusers, and absorbents.

In embodiments, the refractory article made in accordance with the methods of the present disclosure has an apparent porosity, as measured in accordance with ASTM C830, of 35% to 65%. In embodiments, the refractory article made in accordance with the methods of the present disclosure has an apparent porosity of 35% to 60%, including an apparent porosity of 40% to 60%, and also including an apparent porosity of 45% to 55%.

In embodiments, the refractory article made in accordance with the methods of the present disclosure has a bulk density, as measured in accordance with ASTM C830, of 1 g/cm$^3$ to 2.5 g/cm$^3$, including a bulk density of 1 g/cm$^3$ to 2.2 g/cm$^3$, a bulk density of 1.05 g/cm$^3$ to 2.15 g/cm$^3$, a bulk density of 1.1 g/cm$^3$ to 2.1 g/cm$^3$, a bulk density of 1.15 g/cm$^3$ to 2.05 g/cm$^3$, a bulk density of 1.25 g/cm$^3$ to 1.9 g/cm$^3$, a bulk density of 1.3 g/cm$^3$ to 1.6 g/cm$^3$, and also including a bulk density of 1.1 g/cm$^3$ to 1.65 g/cm$^3$.

In embodiments, the refractory article made in accordance with the methods of the present disclosure has a specific density, as measured in accordance with ASTM C830, of 2.15 g/cm$^3$ to 3.75 g/cm$^3$, including a specific density of 2.2 g/cm$^3$ to 3.7 g/cm$^3$, a specific density of 2.5 g/cm$^3$ to 3.1 g/cm$^3$, a specific density of 2.6 g/cm$^3$ to 3 g/cm$^3$, and also including a specific density of 2.7 g/cm$^3$ to 2.9 g/cm$^3$.

In embodiments, the refractory article made in accordance with the methods of the present disclosure has a cold crush strength (CCS), as measured in accordance with a modified version of ASTM C133 (by using a 1.5 inch×1.5 inch×2 inch specimen as opposed to the standard 2 inch×2 inch×2 inch specimen), of 4 MPa to 25 MPa, including a CCS of 4.5 MPa to 22 MPa, a CCS of 4.65 MPa to 20 MPa, a CCS of 5 MPa to 15 MPa, a CCS of 5.5 MPa to 10 MPa, a cold crush strength of 10 MPa to 25 MPa, a CCS of 15 MPa to 25 MPa, and also including a CCS of 17 MPa to 22 MPa. The CCS represents the ability of the refractory article to resist failure under compressive load at room temperature. The CCS can also be viewed as representing the bonding strength of the constituents of the refractory article when tested in compression.

In embodiments, the refractory article made in accordance with the methods of the present disclosure has a dimensional shrinkage (as an absolute value) of 0% to 0.3%, including a dimensional shrinkage of 0.01% to 0.25%, and also including a dimensional shrinkage of 0.01% to 0.15%. Dimensional shrinkage may be determined by measuring a dimension of the green strength article and a dimension of the refractory article, determining the difference between the dimension of the green strength article and the dimension of the refractory article, and dividing the difference by the dimension of the green strength article. Such a dimensional shrinkage indicates that the methods of the present disclosure can be used to form refractory articles having a net shape.

In embodiments, the refractory article made in accordance with the methods of the present disclosure has a cold modulus of rupture (CMOR), as measured in accordance with a modified version of ASTM C133 (by using an 8 inch×1.5 inch×2 inch specimen as opposed to the standard 9 inch×2 inch×2 inch specimen), of 1 MPa to 3.5 MPa, including a CMOR of 1.05 MPa to 3.3 MPa, a CMOR of 1.1 MPa to 3.25 MPa, a CMOR of 1.25 MPa to 3 MPa, a CMOR of 1.5 MPa to 2.5 MPa, a CMOR of 1.75 MPa to 2.25 MPa, a CMOR of 1 MPa to 2 MPa, a CMOR of 1.75 MPa to 3.3 MPa, and also including a CMOR of 2 MPa to 3.25 MPa. The CMOR is an important parameter of the refractory article, as it represents the strength of the refractory article at the limit of its elastic domain. The CMOR is determined using a destructive test.

In embodiments, the refractory article made in accordance with the methods of the present disclosure has a bulk density of 1 g/cm$^3$ to 2.2 g/cm$^3$, an apparent porosity of 35% to 65%, and a ratio of CCS to bulk density of 3 MPa/g/cm$^3$ to 15 MPa/g/cm$^3$. In certain embodiments, the refractory article made in accordance with the methods of the present disclosure has a bulk density of 1 g/cm$^3$ to 2.2 g/cm$^3$, an apparent porosity of 35% to 65%, and a ratio of CCS to bulk density of 3.5 MPa/g/cm$^3$ to 14.5 MPa/g/cm$^3$, including a ratio of CCS to bulk density of 4 MPa/g/cm$^3$ to 14 MPa/g/cm$^3$, a ratio of CCS to bulk density of 4.1 MPa/g/cm$^3$ to 13.75 MPa/g/cm$^3$, and also including a ratio of CCS to bulk density of 5 MPa/g/cm$^3$ to 13.75 MPa/g/cm$^3$. In embodiments, the refractory article made in accordance with the methods of the present disclosure has a bulk density of 1.1 g/cm³ to 2.1 g/cm³, an apparent porosity of 35% to 60%, and a ratio of CCS to bulk density of 4 MPa/g/cm³ to 15 MPa/g/cm³. In embodiments, the refractory article made in accordance with the methods of the present disclosure has a bulk density of 1.12 g/cm³ to 2 g/cm³, an apparent porosity of 40% to 60%, and a ratio of CCS to bulk density of 4 MPa/g/cm³ to 14 MPa/g/cm³. In embodiments, the refractory article made in accordance with the methods of the present disclosure has a bulk density of 1.1 g/cm³ to 1.7 g/cm³, an apparent porosity of 40% to 60%, and a ratio of CCS to bulk density of 4 MPa/g/cm³ to 15 MPa/g/cm³, including a ratio of CCS to bulk density of 4.1 MPa/g/cm³ to 14 MPa/g/cm³, and also including a ratio of CCS to bulk density of 10 MPa/g/cm³ to 15 MPa/g/cm³. The ratio of CCS to bulk density is a normalization referred to as "specific cold crush strength." Such a normalization is useful to compare the CCS of different materials.

In embodiments, the refractory article made according to the methods of the present disclosure has a bulk density of 1 g/cm³ to 2.5 g/cm³ and a ratio of CMOR to bulk density of 0.5 MPa/g/cm³ to 15 MPa/g/cm³. In embodiments, the refractory article made according to the methods of the present disclosure has a bulk density of 1 g/cm³ to 2.5 g/cm³ and a ratio of CMOR to bulk density of 0.5 MPa/g/cm³ to 10 MPa/g/cm³. In embodiments, the refractory article made according to the methods of the present disclosure has a bulk density of 1 g/cm³ to 2.5 g/cm³ and a ratio of CMOR to bulk density of 0.5 MPa/g/cm³ to 8 MPa/g/cm³. In embodiments, the refractory article made according to the methods of the present disclosure has a bulk density of 1 g/cm³ to 2.5 g/cm³ and a ratio of CMOR to bulk density of 0.5 MPa/g/cm³ to 6 MPa/g/cm³. In embodiments, the refractory article made according to the methods of the present disclosure has a bulk density of 1 g/cm³ to 2.2 g/cm³, an apparent porosity of 35% to 65%, and a ratio of CMOR to bulk density of 0.65 MPa/g/cm³ to 3 MPa/g/cm³. In embodiments, the refractory article made according to the methods of the present disclosure has a bulk density of 1 g/cm³ to 2.2 g/cm³, an apparent porosity of 35% to 65%, and a ratio of CMOR to bulk density of 0.65 MPa/g/cm³ to 2.5 MPa/g/cm³, including a ratio of CMOR to bulk density of 0.75 MPa/g/cm³ to 2.25 MPa/g/cm³, a ratio of CMOR to bulk density of 0.85 MPa/g/cm³ to 2.1 MPa/g/cm³, and also including a ratio of CMOR to bulk density of 0.95 MPa/g/cm³ to 2.05 MPa/g/cm³. In embodiments, the refractory article made according to the methods of the present disclosure has a bulk density of 1.1 g/cm³ to 2.1 g/cm³, an apparent porosity of 35% to 60%, and a ratio of CMOR to bulk density of 0.75 MPa/g/cm³ to 2.1 MPa/g/cm³. In embodiments, the refractory article made according to the methods of the present disclosure has a bulk density of 1.12 g/cm³ to 2 g/cm³, an apparent porosity of 40% to 60%, and a ratio of CMOR to bulk density of 0.85 MPa/g/cm³ to 2.1 MPa/g/cm³. The ratio of CMOR to bulk density is a normalization referred to as "specific cold modulus of rupture." Such a normalization is useful to compare the CMOR of different materials.

In embodiments, the refractory article made according to the methods of the present disclosure has a bulk density of 1 g/cm³ to 2.2 g/cm³, an apparent porosity of 35% to 65%, and an isotropic distribution of pores. In embodiments, the refractory article made according to the methods of the present disclosure has a bulk density of 1 g/cm³ to 2.2 g/cm³, an apparent porosity of 35% to 65%, a CCS, as measured in accordance with a modified version of ASTM C133 (by using a 1.5 inch×1.5 inch×2 inch specimen as opposed to the standard 2 inch×2 inch×2 inch specimen), of 4 MPa to 25 MPa, and an isotropic distribution of pores. In embodiments, the refractory article made according to the methods of the present disclosure has a bulk density of 1 g/cm³ to 2.2 g/cm³, an apparent porosity of 35% to 65%, a CMOR, as measured in accordance with a modified version of ASTM C133 (by using an 8 inch×1.5 inch×2 inch specimen as opposed to the standard 9 inch×2 inch×2 inch specimen), of 1 MPa to 3.5 MPa, and an isotropic distribution of pores. In embodiments, the refractory article made in accordance with the methods of the present disclosure has a bulk density of 1 g/cm³ to 2.2 g/cm³, an apparent porosity of 35% to 65%, a ratio of CCS to bulk density of 3 MPa/g/cm³ to 15 MPa/g/cm³, and an isotropic distribution of pores.

As mentioned above, the methods of the present disclosure may include a step in which a refractory fiber material is added to the aqueous slurry prior to casting the aqueous slurry in the mold, to provide a fiber reinforced refractory article. In such embodiments, the fiber reinforced refractory article made according to the methods of the present disclosure may have a bulk density of 1 g/cm³ to 2.5 g/cm³ and a ratio of cold modulus of rupture (CMOR) to bulk density of 6 MPa/g/cm³ to 15 MPa/g/cm³. In embodiments, the fiber reinforced refractory article made according to the methods of the present disclosure may have a bulk density of 1.1 g/cm³ to 2.5 g/cm³ and a ratio of CMOR to bulk density of 8 MPa/g/cm³ to 15 MPa/g/cm³. In embodiments, the fiber reinforced refractory article made according to the methods of the present disclosure may have a bulk density of 1.2 g/cm³ to 2.5 g/cm³ and a ratio of CMOR to bulk density of 10 MPa/g/cm³ to 15 MPa/g/cm³. In embodiments, the fiber reinforced refractory article made according to the methods of the present disclosure may have a bulk density of 1.5 g/cm³ to 2.5 g/cm³ and a ratio of CMOR to bulk density of 12 MPa/g/cm³ to 15 MPa/g/cm³. In embodiments, the fiber reinforced refractory article made according to the methods of the present disclosure may have a bulk density of 1 g/cm³ to 2.5 g/cm³ and a ratio of CMOR to bulk density of 6 MPa/g/cm³ to 10 MPa/g/cm³. When reinforced with refractory fiber material, the refractory articles will typically be less porous because the volume occupied by the refractory fiber material will not participate in the pore formation process, but will exhibit a higher strength, as demonstrated by a higher ratio of CMOR to bulk density.

EXAMPLE

The example that follows illustrates certain exemplary embodiments of refractory articles made in accordance with the methods of the present disclosure. The example is given solely for the purpose of illustration and is not to be construed as limiting of the present disclosure, as many variations thereof are possible without departing from the spirit and scope of the present disclosure.

Three samples (Samples A-C) of refractory articles were made in accordance with the methods of the present disclosure. To make each sample, an aqueous slurry was formed. The aqueous slurry used to make each sample included a mixture of a binder system, a refractory charge, and a second colloidal binder. The weight percentage (based on the total weight of the aqueous slurry) of each component used to form each aqueous slurry (Slurries A-C) is listed below in Table 1.

In addition, three comparative samples (Samples 1-3) of refractory articles were prepared. To make each comparative sample, a comparative aqueous slurry was formed. The comparative aqueous slurry was similar to the aqueous slurry used to form Samples A-C, but did not include the binder system of the present disclosure. The weight percentage (based on the total weight of the comparative aqueous slurry) of each component used to form each comparative aqueous slurry (Slurries 1-3) is listed below in Table 1.

TABLE 1

Aqueous Slurry Compositions

| Components | Slurry A (wt %) | Slurry 1 (wt %) | Slurry B (wt %) | Slurry 2 (wt %) | Slurry C (wt %) | Slurry 3 (wt %) |
|---|---|---|---|---|---|---|
| Wollastonite (refractory charge) | 46 | 50 | — | — | — | — |
| Fused Silica (refractory charge) | — | — | 63 | 67 | — | — |
| Silicon Carbide (refractory charge) | — | — | — | — | 63 | 67 |
| Colloidal Silica (second colloidal binder) | 46 | 50 | 31 | 33 | 31 | 33 |
| Binder System | 8 | — | 6 | — | 6 | — |

The binder system was the same composition for each of Slurries A-C and was prepared as follows. A one kilogram mixture was prepared by mixing together the following ingredients in a stainless steel container: a) food grade table sugar (i.e., sucrose) from Lantic, Inc. (Montreal, Quebec, Canada); b) water; c) laboratory grade phosphoric acid 75 wt % (i.e., a mixture of 75 wt % $H_3PO_4$ and 25 wt % water); d) calcium phosphate monobasic, including $Ca(H_2PO_4)·H_2O$, from Spectrum Chemical Manufacturing Corp. (New Brunswick, NJ); and e) laboratory grade aluminum ammonium sulfate, including $AlNH_4(SO_4)_2·12\ H_2O$, from ACP Chemicals, Inc. (Saint-Leonard, Quebec, Canada).

The mixture was prepared by adding 550 grams of sucrose, 415 grams of water, 11 grams of phosphoric acid (75 wt %), 14 grams of calcium phosphate monobasic, and 10 grams of aluminum ammonium sulfate into a stainless steel container, and then mixing the ingredients together with a paint mixer until a homogenous mixture was obtained.

The homogenous mixture was then heated to a temperature of 80° C. to 120° C. and held at this temperature for at least 5 minutes to form a caramelized carbohydrate component. The caramelized carbohydrate component was allowed to cool at room temperature (e.g., 20° C. to 25° C.).

Next, 515 grams of a first colloidal binder was added to the 1 kilogram of caramelized carbohydrate component. The first colloidal binder was NALCO 1144 colloidal silica available from Nalco Company (Naperville, Illinois). The colloidal silica and the caramelized carbohydrate component were then mixed together using the paint mixer to form the binder system. The mixing was carried out at room temperature (e.g., 20° C. to 25° C.) for a time sufficient to obtain a homogenous binder system (in this case, about 10 minutes).

The requisite amounts of the binder system, the refractory charge, and the second colloidal binder (as indicated in Table 1) were mixed together to form Slurries A-C. A small amount (i.e., about 0.05 wt %) of a rheology modifier (Nalco 625, commercially available from Nalco (Naperville, Illinois)) was added to each of Slurries A-C just prior to casting each aqueous slurry. Next, each aqueous slurry was cast into a mold, and the molds containing the slurries were placed in a freezer at a freezer temperature of −80° C. and held in the freezer overnight (e.g., for about 18-24 hours). The slurries solidified in the mold to form green strength articles, which were demolded and immediately fired in an oven at an oven temperature of 700° C. for 2-3 hours to produce the refractory article samples (i.e., Samples A-C, which correspond to Slurries A-C). The resulting refractory article samples were tested for various physical and mechanical properties, as shown below in Table 2. The comparative samples (Samples 1-3) were prepared in a similar fashion as described above for Samples A-C, and were tested for the same physical and mechanical properties, the results of which are also shown in Table 2.

TABLE 2

Properties of Refractory Article Samples

| Property | Analytical Method | Sample A | Sample 1 | Sample B | Sample 2 | Sample C | Sample 3 |
|---|---|---|---|---|---|---|---|
| Bulk density (g/cm³) | ASTM C830 | 1.14* | 1.23 | 1.30* | 1.41 | 1.60* | 1.76 |
| Specific density (g/cm³) | ASTM C830 | 2.70 | 2.70 | 2.21 | 2.22 | 2.99 | 2.99 |
| Apparent porosity (%) | ASTM C830 | 58* | 55 | 41* | 36 | 47* | 41 |
| Dimensional shrinkage (%) | — | −0.24 | 0.21 | −0.15* | −0.02 | 0.03 | 0.04 |
| Cold Crush Strength (CCS) (MPa) | ASTM C133 | 4.68* | 3.10 | 17.06* | 6.10 | 21.80* | 9.13 |
| Cold Modulus of Rupture (CMOR) (MPa) | ASTM C133 | 1.11* | 0.50 | 1.84* | 0.66 | 3.20* | 1.32 |
| Ratio of CCS to Bulk Density | — | 4.12* | 2.53 | 13.08* | 4.33 | 13.64* | 5.19 |
| Ratio of CMOR to Bulk Density | — | 0.98* | 0.41 | 1.49* | 0.43 | 2.00* | 0.75 |

*Indicates statistically significant difference for the presence of the binder system (ANOVA, p = 0.05).

As seen in Table 2, the refractory articles formed in accordance with the present disclosure (Samples A-C) exhibited statistically significant higher cold crush strength and cold modulus of rupture values as compared to the comparative refractory articles (Samples 1-3). In addition, the apparent porosity values for Samples A-C were statistically significantly higher than the apparent porosity values for comparative Sample 1-3. Furthermore, the ratio of cold crush strength to bulk density and the ratio of cold modulus of rupture to bulk density were also statistically significantly higher for Samples A-C as compared to comparative Samples 1-3. These ratios indicate that the refractory articles made in accordance with the present disclosure (Samples A-C) are mechanically stronger than the comparative refractory articles (Samples 1-3).

Figure 1:
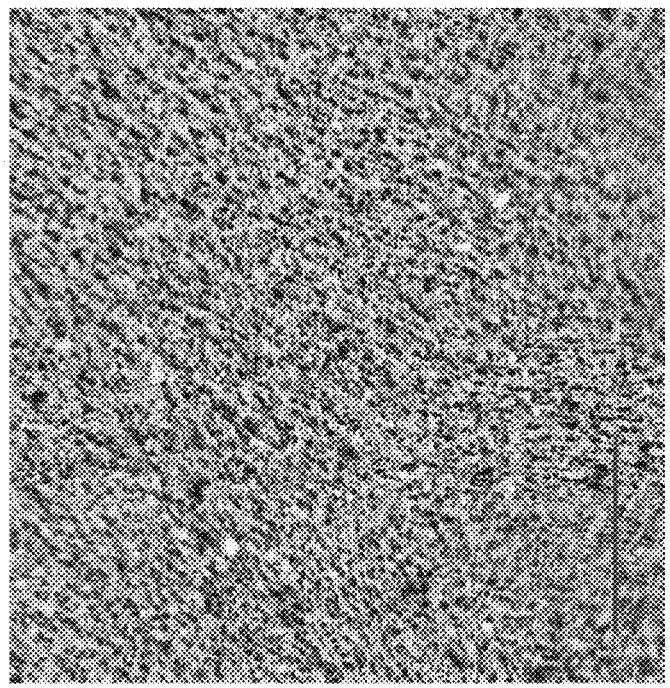
FIG. 1 is an optical digital microscope image, at approximately 100× magnification, of a refractory article made in accordance with an exemplary method of the present disclosure (scale bar is 1 mm)

It is believed that the improved strength exhibited by Samples A-C results from the isotropic distribution of pores created using the methods of the present disclosure. FIG. 1 shows an optical digital microscope image of the refractory article corresponding to Sample C, which uses silicon carbide as the refractory charge. As seen in FIG. 1, the pores of the refractory article have a uniform size, shape, and distribution throughout the refractory article. On the other hand, FIG. 2 shows a similar image of the comparative refractory article corresponding to Sample 3, which also uses silicon carbide as the refractory charge. Unlike the isotropic distribution of pores of Sample C shown in FIG. 1, the pores of Sample 3 as shown in FIG. 2 clearly do not have a uniform size, shape, or distribution throughout the refractory article of Sample 3.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the present disclosure, in its broader aspects, is not limited to the specific details, the representative compositions and processes, and illustrative examples shown and described. Accordingly, departures may be made from such details without departing from the spirit or scope of the present disclosure.

What is claimed is:

1. A refractory article made by a method comprising:
   a) mixing a binder system, a refractory charge, and a second colloidal binder to form an aqueous slurry, wherein the binder system comprises from 2 wt % to 10 wt % of the aqueous slurry, the refractory charge comprises from 40 wt % to 75 wt % of the aqueous slurry, and the second colloidal binder comprises from 20 wt % to 50 wt % of the aqueous slurry;
   b) casting the aqueous slurry into a mold, wherein the aqueous slurry is at a slurry casting temperature;
   c) solidifying the aqueous slurry cast into the mold by freezing, thereby forming a green strength article; and
   d) firing the green strength article at a temperature of at least 450° C. for a time sufficient to achieve thermal homogeneity, thereby forming a refractory article, and
   wherein the binder system comprises a pre-caramelized, caramelized carbohydrate component, a first colloidal binder, and an adjuvant, and the refractory article has a globular pore structure and an isotropic distribution of pores.

2. The refractory article of claim 1, wherein the refractory article has a bulk density of 1 g/cm$^3$ to 2.2 g/cm$^3$, an apparent porosity of 35% to 65%, and a ratio of cold crush strength to bulk density of 4 MPa/g/cm$^3$ to 25 MPa/g/cm$^3$.

3. The refractory article of claim 2, wherein the ratio of cold crush strength to bulk density is from 10 MPa/g/cm$^3$ to 15 MPa/g/cm$^3$.

4. The refractory article of claim 1, wherein the refractory article has a bulk (Original) density of 1 g/cm$^3$ to 2.2 g/cm$^3$, an apparent porosity of 35% to 65%, and a ratio of cold modulus of rupture to bulk density of 0.6 MPa/g/cm$^3$ to 2.5 MPa/g/cm$^3$.

5. The refractory article of claim 4, wherein the ratio of cold modulus of rupture to bulk density is from 0.85 MPa/g/cm$^3$ to 2.1 MPa/g/cm$^3$.

6. The refractory article of claim 1, further comprising a reinforcement material embedded in the refractory article.

7. The refractory article of claim 6, wherein the refractory article has a bulk density of 1 g/cm$^3$ to 2.5 g/cm$^3$ and a ratio of cold modulus of rupture to bulk density of 6 MPa/g/cm$^3$ to 15 MPa/g/cm$^3$.

8. The refractory article of claim 1, wherein the refractory charge comprises at least one of a silicate, a metal oxide, a boride, a nitride, a carbide, a sulfide, a fluoride, an aluminide, a synthetic glass, glass fibers, refractory ceramic fibers, non-refractory ceramic fibers, graphite, bone ash, aluminum titanate, or calcium aluminate.

9. The refractory article of claim 1, wherein the pre-caramelized, caramelized carbohydrate component is derived from at least one of sucrose, glucose, fructose, galactose, maltose, or lactose.

10. The refractory article of claim 1, wherein the first colloidal binder comprises at least one of a colloidal silica, a colloidal alumina, a colloidal zirconia, a colloidal yttria, an organically modified colloidal silica, an organically modified colloidal alumina, an organically modified colloidal zirconia, or an organically modified colloidal yttria.

11. The refractory article of claim 1, wherein the adjuvant comprises at least one of an acid, an inorganic wetting agent, or an acid phosphate adhesive.

12. The refractory article of claim 11, wherein when the adjuvant comprises an acid, the acid comprises at least one of phosphoric acid, sulfuric acid, citric acid, acetic acid, boric acid, or oxalic acid;
   wherein when the adjuvant comprises an inorganic wetting agent, the inorganic wetting agent comprises at least one of aluminum ammonium sulfate, magnesium sulfate, aluminum sulfate, or calcium sulfate; and
   wherein when the adjuvant comprises an acid phosphate adhesive, the acid phosphate adhesive comprises at least one of calcium phosphate, magnesium phosphate, or aluminum phosphate.

13. The refractory article of claim 1, wherein the pre-caramelized, caramelized carbohydrate component comprises from 5 wt % to 70 wt % of the binder system, the adjuvant comprises from 0.25 wt % to 10 wt % of the binder system, and the first colloidal binder comprises from 25 wt % to 90 wt % of the binder system.

14. The refractory article of claim 1, wherein the second colloidal binder comprises at least one of a colloidal silica, a colloidal alumina, a colloidal zirconia, a colloidal yttria, an organically modified colloidal silica, an organically modified colloidal alumina, an organically modified colloidal zirconia, or an organically modified colloidal yttria.

15. A refractory article made by the method according to claim 1, comprising:
   a refractory charge material comprising at least one of a silicate, a metal oxide, a boride, a nitride, a carbide, a sulfide, a fluoride, an aluminide, a synthetic glass, glass fibers, refractory ceramic fibers, non-refractory ceramic fibers, graphite, bone ash, aluminum titanate, or calcium aluminate; and
   a binder material comprising at least one of silica, alumina, zirconia, or yttria,
   wherein the refractory article has a globular pore structure and an isotropic distribution of pores.

16. The refractory article of claim 15, wherein the refractory article has a bulk density of 1 g/cm$^3$ to 2.2 g/cm$^3$, an apparent porosity of 35% to 65%, and a ratio of cold crush strength to bulk density of 4 MPa/g/cm$^3$ to 25 MPa/g/cm$^3$.

17. The refractory article of claim 15, wherein the refractory article has a bulk density of 1 g/cm$^3$ to 2.2 g/cm$^3$, an apparent porosity of 35% to 65%, and a ratio of cold modulus of rupture to bulk density of 0.6 MPa/g/cm$^3$ to 2.5 MPa/g/cm$^3$.

18. The refractory article of claim 15, further comprising a reinforcement material embedded in the refractory article.

19. The refractory article of claim 18, wherein the refractory article has a bulk density of 1 g/cm$^3$ to 2.5 g/cm$^3$ and a ratio of cold modulus of rupture to bulk density of 6 MPa/g/cm$^3$ to 15 MPa/g/cm$^3$.

* * * * *

UNITED STATES PATENT AND TRADEMARK OFFICE
CERTIFICATE OF CORRECTION

| | | |
|---|---|---|
| PATENT NO. | : 12,091,365 B2 | Page 1 of 1 |
| APPLICATION NO. | : 17/717213 | |
| DATED | : September 17, 2024 | |
| INVENTOR(S) | : Marcel Gouin, François Veillette and Alain Simard | |

It is certified that error appears in the above-identified patent and that said Letters Patent is hereby corrected as shown below:

In the Claims

Column 19, Claim 4, Line 64, remove:
article has a bulk (Original) density of 1 $g/cm^3$ to 2.2 $g/cm^3$, Insert:
--article has a bulk density of 1 $g/cm^3$ to 2.2 $g/cm^3$,--

Signed and Sealed this
Fifteenth Day of October, 2024

Katherine Kelly Vidal
*Director of the United States Patent and Trademark Office*